United States Patent [19]

Wolfe

[11] Patent Number: 4,799,913
[45] Date of Patent: Jan. 24, 1989

[54] GAME CALL HAVING A TWO-DIAPHRAGM SOUNDER AND LIP STRUCTURE

[76] Inventor: Gilbert H. Wolfe, 412 W. 15th St., New Cumberland, Pa. 17070

[21] Appl. No.: 55,460

[22] Filed: May 29, 1987

[51] Int. Cl.[4] .............................................. A63H 5/00
[52] U.S. Cl. .................................... 446/193; 446/203; 446/213; 84/330
[58] Field of Search ............... 446/192, 193, 203, 213, 446/180, 188, 197, 209; 43/1, 2, 3; 84/330

[56] References Cited

U.S. PATENT DOCUMENTS

| | | | |
|---|---|---|---|
| 677,113 | 6/1901 | Bruce | 446/193 |
| 2,969,611 | 1/1961 | Warren | 446/202 |
| 3,811,221 | 5/1974 | Wilt | 446/202 |
| 3,815,283 | 6/1974 | Piper | 446/202 |
| 3,900,993 | 8/1975 | Betters | 446/193 |
| 3,968,592 | 7/1976 | Piper | 446/193 |
| 4,048,750 | 9/1977 | Wolfe | 446/193 |
| 4,576,584 | 3/1986 | Hill | 446/193 |

Primary Examiner—Robert A. Hafer
Assistant Examiner—Charles H. Harris
Attorney, Agent, or Firm—Thomas Hooker

[57] ABSTRACT

A hand-operated game call having a sound chamber, a handle including a horn at one end of the chamber, a bellows at the other end of the chamber and openings in both chamber ends; the chamber including a diaphragm normally closing each chamber, each diaphragm having a normally taut edge engaging an opening chord edge, the chord edge including a lip on the outside of the wall for preventing the diaphragm from overlapping the wall during vibration.

12 Claims, 2 Drawing Sheets

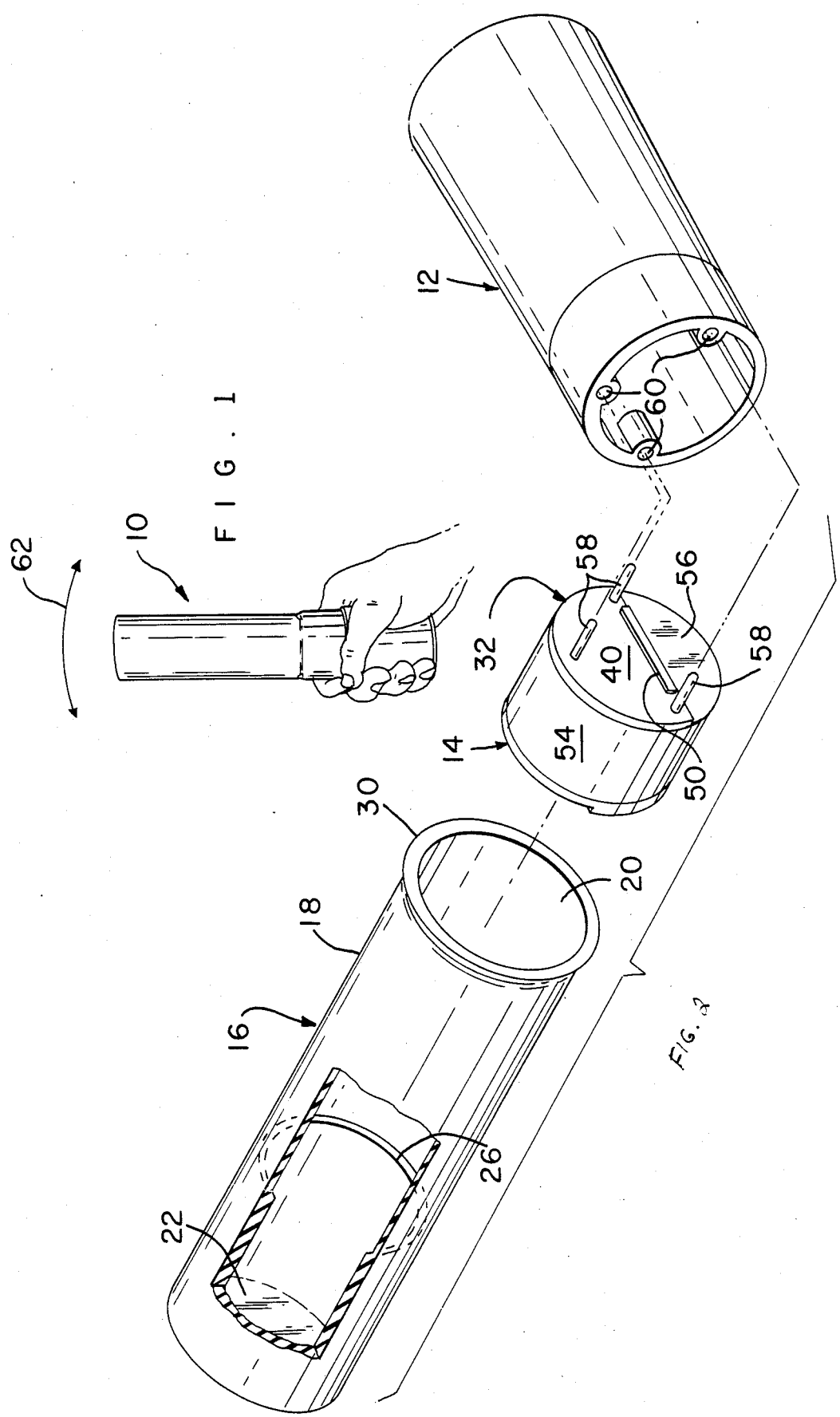

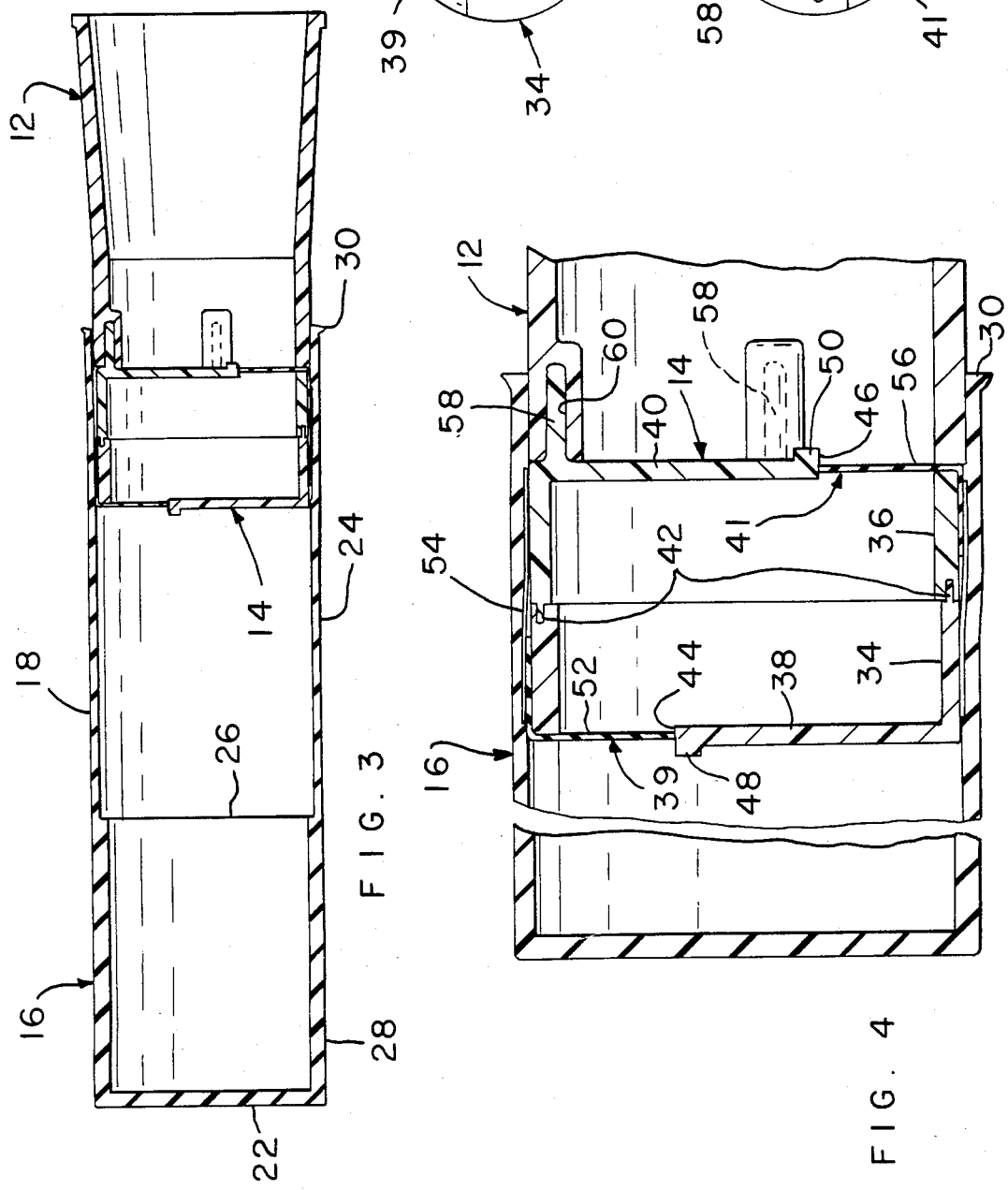

GAME CALL HAVING A TWO-DIAPHRAGM SOUNDER AND LIP STRUCTURE

The present invention relates to an improved game call for simulating various wild turkey calls.

My prior U.S. Pat. No. 4,048,750 discloses a unitary game call including a cylindrical handle, a two diaphragm sound chamber, a collapsible bellows and a weight at the end of the bellows. The call is used by gripping the handle and rotating the call so that the weight alternately collapses and expands the bellows to force air back and forth through the sound chamber and handle. The air vibrates diaphragms in the sound chamber to simulate the call of a wild turkey.

The present invention is an improvement over the call of my prior patent and includes a megaphone handle, a detachable sound chamber with improved sound qualities and a detachable tubular rubber handle. The call produces an improved simulated turkey call.

The modular construction of the call permits the handle, sound chamber and bellows to be readily and rapidly disassembled so that the sound chamber can be readily and easily replaced in the event one of the vibrating diaphragms fails.

Other objects and features of the invention will become apparent as the description proceeds, especially when taken in conjunction with the accompanying drawings illustrating the invention, of which there are two sheets and one embodiment.

IN THE DRAWINGS

FIG. 1 is the perspective view of a game call according to the invention in use;

FIG. 2 is an exploded view of the call of FIG. 1;

FIG. 3 is a sectional view taken through the axis of the call;

FIG. 4 is a enlarged view of a portion of FIG. 3, broken away;

FIG. 5 is a view of the end of the sound chamber adjacent the bellows; and

FIG. 6 is an end view of the sound chamber adjacent the handle.

Game call 10 includes a handle 12, a two-diaphragm sound chamber 14 and a tubular bellows 16. As illustrated in FIG. 3, the sound chamber 14 is located between handle 12 and bellows 16 with the end of the bellows fitted around the chamber and the handle. In use, game call 10 is held by handle 12 as shown in FIG. 1 and is shaken to move the weighted bellows back and forth with respect to the handle and sound chamber to alternately collapse and expand the bellows and force air back and forth through the chamber, thereby generating a sound simulating the call of a wild turkey.

Bellows 16 is molded from a rubber material and includes a cylindrical wall 18 extending between open end 20 and closed end 22. The wall 18 includes a thin, flexible wall portion 24 extending from end 20 to an internal step 26 and a relatively thick and inflexible wall portion 28 extending from step 26 to closed end 22. The closed end has a thickness comparable to the thickness of thick wall portion 28. Triangular grip rib 30 projects outwardly of the bellows at end 20 to facilitate mounting of the bellows on the handle and sound chamber.

The sound chamber 14 includes a rigid cylindrical body 32 formed from a pair of cylindrical end pieces 34 and 36 each having an end wall 38, 40. The end pieces 34 and 36 are secured together by key and slot connections 42 as shown in FIG. 4. A portion of end wall 38 is cut away at chord 44 to define a diaphragm opening 39 extending between the chord and the subtended arc of end piece 34. A portion of end wall 40 is likewise cut away at chord 46 to define a diaphragm opening 41 extending between the chord 46 to the subtended arc of end piece 36. Chord 44 is shorter than chord 46 so that the opening 39 in end wall 38 is smaller than the opening 41 in end wall 40 as illustrated best in FIGS. 5 and 6. Lips 48 and 50 project outwardly of the end walls 38 and 40 at chordal edges 44 and 46 and increase the widths of the edges. The key and slot connections 42 orient end pieces 34 and 36 so that chords 44 and 46 parallel each other and the corresponding openings are on opposite sides of the sound chamber.

A thin high frequency latex diaphragm 52 is stretched across opening 39 at chord 44 and includes a straight edge normally held against the edge at the chord. The diaphragm is secured to the sound chamber wall by circumferential wrapping 54. A similar low frequency latex diaphragm 56 is stretched across the opening 41 at chord 46 and secured to the sound chamber by wrapping 54. The edge of diaphragm 56 normally rests on chord edge 46. Both diaphragms are distorted and vibrate when air passes into and out of the sound chamber through the openings 39 and 41 upon collapse and expansion of bellows 16.

In sound chamber 14 the low frequency diaphragm 52 covers the opening defined by the shorter chord 44 and its subtended arc and the high frequency diaphragm 56 covers the larger opening defined by the longer chord 46 and its subtended arc. The low frequency diaphragm opens into the interior of bellows 16 and the high frequency diaphragm opens into the interior opening of the hollow handle 12. As shown in FIG. 3 this opening is outwardly flared like a megaphone to amplify the sound generated by chamber 14.

Three integral mounting pins 58 extend axially from wall 40 for frictional engagement in the three mounting holes 60 formed in the adjacent end of handle 12.

The call 10 is assembled from the individual components shown in FIG. 2 by seating the pins 58 in holes 60 to frictionally mount the sound chamber on the handle. The open end 20 of bellows 16 is then gripped using ridge 30 and slid over the sound chamber and onto the upper end of the handle to form a resilient seal against the chamber and the handle, thereby assuring that air flowing into and out of the bellows passes through the handle and chamber. The interior diameter of the bellows thin wall portion 18 is slightly less than the diameter of the sound chamber and the adjacent end of handle 12 to assure that the bellows grips the chamber and handle to form a tight connection which is not dislodged during normal use of the call.

As shown in FIG. 1, call 10 is used by holding handle 12 and rotated the call back and forth as indicated by arrow 62. Upon rotation of the call the weight of the bellows thick portion 28 collapses and then re-expands the bellows to force air alternately outwardly and inwardly through the second chamber 14. The outward and inward movement of the air vibrates the diaphragms 52 and 56 producing sounds accurately simulating the call of the wild turkey. It is believed that the sounds produced by the flow of air into and out of the sound chamber reverberate between walls 38 and 40 thereby enhancing the resultant sound which is then amplified as it passes from the sound chamber and out megaphone-shaped handle 12.

Location of the smaller low frequency diaphragm 52 adjacent the bellows and the larger high frequency diaphragm 56 adjacent the handle enhances the reverberation and simulation of a turkey call. The call is further enhanced by locating chords 44 and 46 parallel to each other and on opposite sides of the sound chamber.

Call 10 may be used to produce the various turkey calls described in my prior patent. These calls are simulated with great accuracy and facilitate hunters and photographers desiring to lure and reassure turkeys.

The diaphragms 52 and 56 are vibrated back and forth as air is flowed through the sound chamber, thus generating the desired call. Vibration of the diaphragms moves the straight diaphragm edges back and forth across the chords 44 and 46 and the lips 48 and 50 forming extensions of the chords. The lips 48 and 50 prevent the diaphragm edges from slipping down over the chords and resting against the end walls 38 and 40. Contact with the end walls inhibits proper vibration of the diaphragms and degrades the quality of the call.

During use of the call the diaphragms 52 and 56 are subjected to considerable stress as they vibrate in response to movement of air back and forth through the sound chamber. Protracted use of the call may, on occasion, injure a diaphragm thereby degrading the quality of the call. The modular construction of the call 10 permits the user to readily replace a sound chamber with an inoperational diaphragm with a new sound chamber. This is done by simply removing the bellows from the handle and sound chamber and then disengaging the old sound chamber from the handle. The call is easily reassembled by placing the new sound chamber on the end of the handle as described and fitting the bellows over the new chamber and handle. In this way, the useful life of the call is increased. Users may easily repair the call as required.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A game call comprising a sound chamber, a handle including a horn, first connection means joining the handle and sound chamber, a bellows, second connection means joining the bellows and sound chamber so that collapse and expansion of the bellows forces air through the sound chamber, the sound chamber including an interior volume, a first end wall with an opening therein communicating with the bellows and a second end wall with an opening therein spaced from the first end wall and communicating with the horn, a first flexible diaphragm normally closing the opening in the first end wall, a second flexible diaphragm normally closing the opening in the second end wall, each opening including a chord edge and a concave edge , each diaphragm including a taut edge normally resting on the chord edge of the opening, and a lip extending along the chord edge of each opening on the outside of the end wall and outwardly of the end wall for preventing the diaphragm from overlapping the end wall during vibration.

2. A game call as in claim 1 wherein the sound chamber includes a generally cylindrical body, said end walls parallel each other, said chords parallel each other and said concave edge is arcuate.

3. A game call as in claim 1 wherein the chord edge of the opening in the second end wall is longer than the chord edge of the opening in the first end wall.

4. A game call as in claim 1 wherein the sound chamber includes a pair of end pieces each including a cylindrical portion and one of said end walls, and key means orienting said end pieces with the openings located on opposite sides of the chamber.

5. A game call as in claim 1 wherein said first connection means includes a pin and hole connection removably joining the handle and sound chamber.

6. A game call as in claim 1 wherein said first connection means includes a plurality of pins extending outwardly from the second end wall, a plurality of holes in the handle, said pins being frictionally seated in the holes.

7. A game call as in claim 1 wherein said second connection means includes a tubular portion of the bellows fitted snugly around the outer circumference of the sound chamber.

8. A game call as in claim 7 wherein said second connection means also includes a portion of the bellows fitted snugly around the end of the handle adjacent the sound chamber.

9. A game call as in claim 1 wherein said horn increases in cross section away from the sound chamber so as to amplify sound generated by vibration of the diaphragms.

10. A two diaphragm sound chamber for use in a game call including a hollow cylindrical body having opposed end walls, a diaphragm opening in each end wall, a diaphragm normally closing each opening, means for holding the diaphragms in place across the openings, each opening including a straight edge, said edges paralleling each other and said openings being located on opposite sides of the body, and a lip extending along one straight edge on the outside of the end wall and outwardly of the end wall for preventing the diaphragm from overlapping such end wall during vibration.

11. A sound chamber as in claim 10 wherein said body includes a pair of end pieces each having a cylindrical portion and one of said end walls, and keying means securing said cylindrical portions together.

12. A sound chamber as in claim 10 including a plurality of mounting pins extending from one end wall.

* * * * *